(12) United States Patent
Tanabe et al.

(10) Patent No.: US 10,705,505 B2
(45) Date of Patent: Jul. 7, 2020

(54) NUMERICAL CONTROL DEVICE

(71) Applicant: Mitsubishi Electric Corporation, Tokyo (JP)

(72) Inventors: Akira Tanabe, Tokyo (JP); Munehiro Murata, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/305,239

(22) PCT Filed: Dec. 21, 2017

(86) PCT No.: PCT/JP2017/045868
§ 371 (c)(1),
(2) Date: Nov. 28, 2018

(87) PCT Pub. No.: WO2019/123593
PCT Pub. Date: Jun. 27, 2019

(65) Prior Publication Data
US 2019/0196446 A1 Jun. 27, 2019

(51) Int. Cl.
B23Q 11/00 (2006.01)
G05B 19/402 (2006.01)
(Continued)

(52) U.S. Cl.
CPC ....... G05B 19/4063 (2013.01); G05B 19/402 (2013.01); G05B 19/4163 (2013.01); B23Q 11/0042 (2013.01); G05B 2219/37598 (2013.01)

(58) Field of Classification Search
CPC .............. B23Q 11/0042; G05B 19/402; G05B 19/4063; G05B 19/4163; G05B 2219/37598
See application file for complete search history.

(56) References Cited

U.S. PATENT DOCUMENTS 4,547,847 A    10/1985 Olig et al.
5,377,116 A    12/1994 Wayne et al.
(Continued)

FOREIGN PATENT DOCUMENTS

CN    105965313 A    9/2016
DE    33 48 159 C2   12/1992
(Continued)

OTHER PUBLICATIONS

International Search Report and Written Opinion for International Application No. PCT/JP2017/045868, dated Mar. 13, 2018.
(Continued)

Primary Examiner — Abdelmoniem I Elamin
(74) Attorney, Agent, or Firm — Xsensus LLP

(57) ABSTRACT

A numerical control device includes: an estimation unit to estimate an accumulation amount of swarf to be produced when a tool mounted on a machine tool cuts a workpiece on the basis of a machining condition in cutting the workpiece by the tool and a value of current to be applied to a motor for moving a shaft of the machine tool when the tool cuts the workpiece. The numerical control device further includes a correction unit to correct the accumulation amount of swarf estimated by the estimation unit on the basis of a machining mode specifying a shape of swarf to be produced when the tool cuts the workpiece.

10 Claims, 2 Drawing Sheets

(51) Int. Cl.
  *G05B 19/4063* (2006.01)
  *G05B 19/416* (2006.01)

(56) References Cited

U.S. PATENT DOCUMENTS

| | | | | |
|---|---|---|---|---|
| 10,086,487 | B2* | 10/2018 | Itou | B23Q 11/0046 |
| 10,195,649 | B2* | 2/2019 | Takikawa | B25J 11/0085 |
| 10,201,839 | B2* | 2/2019 | Takikawa | B25J 11/0085 |
| 10,279,448 | B2* | 5/2019 | Nakayama | B25J 15/0491 |
| 10,307,876 | B2* | 6/2019 | Okuda | B08B 9/00 |
| 2007/0062615 | A1 | 3/2007 | Oishi | |
| 2016/0263745 | A1* | 9/2016 | Shirahata | B25J 9/1697 |
| 2016/0311076 | A1* | 10/2016 | Matsumoto | B23Q 11/0075 |
| 2016/0354887 | A1 | 12/2016 | Kakutani et al. | |
| 2017/0075337 | A1 | 3/2017 | Kameta et al. | |
| 2017/0316323 | A1 | 11/2017 | Nakanishi et al. | |
| 2019/0084064 | A1* | 3/2019 | Kasai | B23H 1/10 |

FOREIGN PATENT DOCUMENTS

| | | |
|---|---|---|
| DE | 10 2016 002 658 B4 | 9/2016 |
| JP | 2009-509031 A | 3/2009 |
| JP | 2014-213434 A | 11/2014 |
| JP | 2015-052927 A | 3/2015 |
| JP | 2016-168661 A | 9/2016 |
| JP | 2016-172300 A | 9/2016 |
| JP | 2016-221662 A | 12/2016 |
| JP | 2017-056515 A | 3/2017 |
| JP | 2017-199256 A | 11/2017 |

OTHER PUBLICATIONS

Decision to Grant a Patent for application No. 2018-521135, dated May 22, 2018 (with English translation) 4 pages.
German Office Action dated Sep. 30, 2019 in German Application No. 11 2017 003 251.2.
Office Action dated Mar. 20, 2020 in Chinese Patent Application No. 201780041843.8, 11 pages.

* cited by examiner

| | FIRST MACHINING MODE | | SECOND MACHINING MODE | |
|---|---|---|---|---|
| | NORMAL TURNING | | VIBRATION TURNING | |
| | X SHAFT | MAIN SHAFT | X SHAFT | MAIN SHAFT |
| MOTOR ROTATING DIRECTION | UNI-DIRECTIONAL | UNI-DIRECTIONAL | BIDIRECTIONAL | UNI-DIRECTIONAL |
| PURPOSE OF CURRENT | CUTTING LOAD | | CUTTING LOAD AND ACCELERATION/ DECELERATION | CUTTING LOAD |
| SWARF SHAPE | SPIRAL | | CHIPS | |

NUMERICAL CONTROL DEVICE

CROSS-REFERENCE TO RELATED APPLICATION

This application is a National Stage Application based on PCT/JP2017/045868, filed on 21 Dec. 2017, the entire contents of which are being incorporated herein by reference.

FIELD

The present invention relates to a numerical control device that controls a machine tool.

BACKGROUND

A machine tool cuts a workpiece to be machined according to control performed by a numerical control device. Specifically, a tool is mounted on the machine tool, and a mechanism for moving the tool in the machine tool operates according to the control performed by the numerical control device, so that the position of the tool moves to perform cutting of the workpiece. For example, the machine tool is a lathe or a machining center. For example, the workpiece is formed of metal.

When cutting of a workpiece is performed, swarf is produced. Swarf caught in one or both of the tool and the workpiece causes degradation in the accuracy of cutting, damage on the tool, or an alert due to an increase in processing load, and therefore the swarf accumulated in a container of the machine tool needs to be removed periodically.

In related art, a chip discharge device including a chip conveyor in which the position of a chip discharge side is lower than the position of a chip receiving side is proposed (refer to Patent Literature 1, for example). In related art, a processing machine system that estimates an accumulation amount of chips on the basis of a processing program, and collects the chips by a robot when the estimated accumulation amount of chips has reached a predetermined amount is also proposed (refer to Patent Literature 2, for example).

CITATION LIST

Patent Literature

Patent Literature 1: Japanese Patent Application Laid-open No. 2016-221662
Patent Literature 2: Japanese Patent Application Laid-open No. 2016-168661

SUMMARY

Technical Problem

The aforementioned chip discharge device, however, has a chip conveyor, and therefore has a problem of being relatively large in size. The aforementioned processing machine system also requires a robot, which needs a space for installing the robot, and therefore has the problem of being relatively large in size. In a case where the installation area for a machine tool is limited, it is difficult to use of a chip conveyor or a robot.

In a case where a chip conveyor or a robot cannot be used, an operator needs to check the accumulation amount of swarf. When the accumulation amount of swarf accumulated in a container of a machine tool is relatively small and the swarf need not be removed from the container, the work of checking the accumulation amount of swarf by the operator is a waste. When the operator fails to check the accumulation amount of swarf, however, the swarf will overflow from the container and may cause degradation in the accuracy of cutting, damage on the tool, or an alert. The volume of continuous swarf tends to be larger than the volume of swarf in chips since gaps are likely to be produced in continuous swarf. This means that the accumulation amount of swarf is dependent on the shape of the swarf. There has been a demand for a device that assists an operator to remove swarf at appropriate timing without addition of a device for removal of swarf to a machine tool.

The present invention has been made in view of the above, and an object thereof is to provide a numerical control device for assisting an operator to remove swarf at appropriate timing.

Solution to Problem

To solve the aforementioned problems and achieve the object, the present invention includes an estimation unit that estimates an accumulation amount of swarf to be produced when a tool mounted on a machine tool cuts a workpiece on the basis of a machining condition in cutting the workpiece by the tool and a value of current to be applied to a motor for moving a shaft of the machine tool when the tool cuts the workpiece. The present invention further includes a correction unit that corrects the accumulation amount of swarf estimated by the estimation unit on the basis of a machining mode specifying a shape of swarf to be produced when the tool cuts the workpiece.

Advantageous Effects of Invention

A numerical control device according to the present invention produces an advantageous effect of assisting an operator to remove swarf at appropriate timing.

DESCRIPTION OF EMBODIMENTS

A numerical control device according to an embodiment of the present invention will be described in detail below with reference to the drawings. Note that the present invention is not limited to the embodiment.

Embodiment

Figure 1:
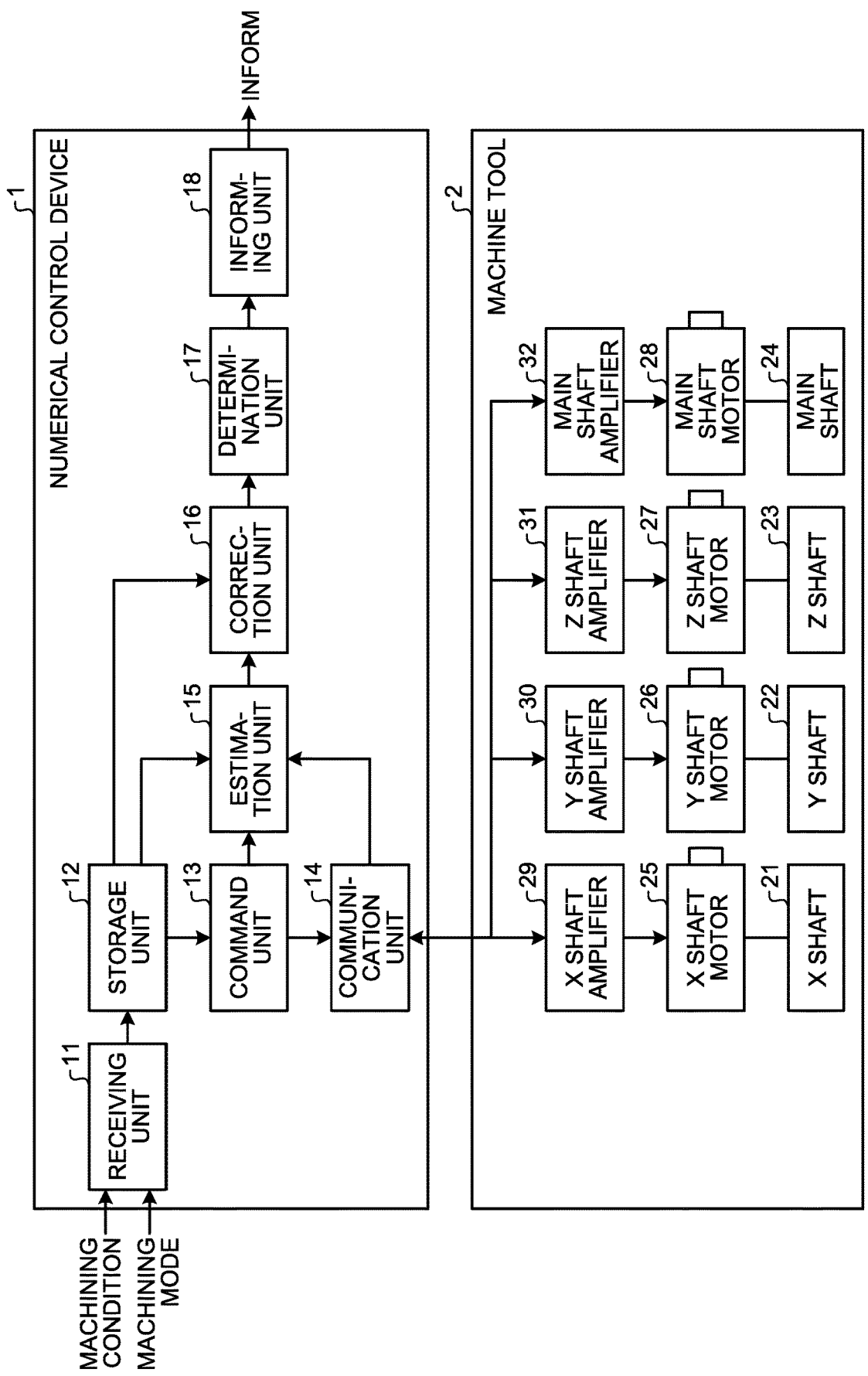
FIG. 1 is a diagram illustrating a configuration of a numerical control device according to an embodiment.

FIG. 1 is a diagram illustrating a configuration of a numerical control device 1 according to the embodiment. The numerical control device 1 is a device that controls a machine tool 2. FIG. 1 also illustrates the machine tool 2. In the embodiment, the numerical control device 1 controls the machine tool 2 when a machine tool mounted on the machine tool 2 cuts a workpiece to be machined, and estimates the accumulation amount of swarf produced when the tool cuts the workpiece. The tool and the workpiece are not illustrated in FIG. 1. The tool and the workpiece will be described later with reference to FIG. 2.

Before description of a configuration of the numerical control device 1, description of a configuration of the machine tool 2 will be provided. The machine tool 2 includes a tool rest on which the tool is mounted, and has an X shaft 21, a Y shaft 22, and a Z shaft 23 for moving the tool rest. The X shaft 21, the Y shaft 22, and the Z shaft 23 are not to define directions, but are components of the machine tool 2. Each of the X shaft 21, the Y shaft 22, and the Z shaft 23 are perpendicular to the other two shafts. The tool rest is not illustrated in FIG. 1. The tool rest will be described later with reference to FIG. 2.

The machine tool 2 further includes a main shaft 24 on which a workpiece is mounted. The main shaft 24 is not to define a direction, but is a component of the machine tool 2. The main shaft 24 rotates. The machine tool 2 further includes an X shaft motor 25 for driving the X shaft 21, a Y shaft motor 26 for driving the Y shaft 22, a Z shaft motor 27 for driving the Z shaft 23, and a main shaft motor 28 for driving the main shaft 24.

The machine tool 2 further includes an X shaft amplifier 29 for applying current to the X shaft motor 25, a Y shaft amplifier 30 for applying current to the Y shaft motor 26, a Z shaft amplifier 31 for applying current to the Z shaft motor 27, and a main shaft amplifier 32 for applying current to the main shaft motor 28. The X shaft motor 25 operates on the basis of the current applied by the X shaft amplifier 29, the Y shaft motor 26 operates on the basis of the current applied by the Y shaft amplifier 30, the Z shaft motor 27 operates on the basis of the current applied by the Z shaft amplifier 31, and the main shaft motor 28 operates on the basis of the current applied by the main shaft amplifier 32.

Next, the configuration of the numerical control device 1 will be described. The numerical control device 1 includes a receiving unit 11 for receiving first information indicating a machining condition in cutting a workpiece by the tool mounted on the machine tool 2, and second information indicating a machining mode specifying the shape of swarf in cutting a workpiece by the tool, from outside of the numerical control device 1. For example, the machining condition indicates some or all of the shape of a workpiece, the material of the workpiece, the shape of a tool, the material of the tool, the cutting depth to which the tool is to cut the workpiece, the feed speed of the tool, the movement amount of each of the X shaft 21, the Y shaft 22, and the Z shaft 23 of the machine tool 2, the moving speed of each of the X shaft 21, the Y shaft 22, and the Z shaft 23, and the number of rotation per unit time of the main shaft 24 of the machine tool 2. The machining mode will be described later with reference to FIG. 3.

The numerical control device 1 further includes a storage unit 12 for storing the first information and the second information received by the receiving unit 11. One example of the storage unit 12 is a flash memory. The numerical control device 1 further includes a command unit 13 for calculating a command value for controlling the operation of each of the X shaft 21, the Y shaft 22, the Z shaft 23, and the main shaft 24 of the machine tool 2 on the basis of the machining condition indicated by the first information stored in the storage unit 12 and the machining mode indicated by the second information stored in the storage unit 12.

The numerical control device 1 further includes a communication unit 14 for transmitting information indicating the command value calculated by the command unit 13 to the X shaft amplifier 29, the Y shaft amplifier 30, the Z shaft amplifier 31, and the main shaft amplifier 32. Specifically, the communication unit 14 transmits information indicating an X shaft command value for controlling the operation of the X shaft 21 calculated by the command unit 13 to the X shaft amplifier 29, and information indicating a Y shaft command value for controlling the operation of the Y shaft 22 calculated by the command unit 13 to the Y shaft amplifier 30. The communication unit 14 transmits information indicating a Z shaft command value for controlling the operation of the Z shaft 23 calculated by the command unit 13 to the Z shaft amplifier 31, and information indicating a main shaft command value for controlling the operation of the main shaft 24 calculated by the command unit 13 to the main shaft amplifier 32.

The X shaft amplifier 29 receives the information indicating the X shaft command value from the communication unit 14, and applies current corresponding to the X shaft command value to the X shaft motor 25. The Y shaft amplifier 30 receives the information indicating the Y shaft command value from the communication unit 14, and applies current corresponding to the Y shaft command value to the Y shaft motor 26. The Z shaft amplifier 31 receives the information indicating the Z shaft command value from the communication unit 14, and applies current corresponding to the Z shaft command value to the Z shaft motor 27. The main shaft amplifier 32 receives the information indicating the main shaft command value from the communication unit 14, and applies current corresponding to the main shaft command value to the main shaft motor 28.

The X shaft motor 25 transmits power based on the current applied by the X shaft amplifier 29 to the X shaft 21 via a transfer mechanism to drive the X shaft 21. The transfer mechanism is not illustrated in FIG. 1. One example of the transfer mechanism is a ball screw. Similarly, the Y shaft motor 26 transmits power based on the current applied by the Y shaft amplifier 30 to the Y shaft 22 via a transfer mechanism to drive the Y shaft 22. The Z shaft motor 27 transmits power based on the current applied by the Z shaft amplifier 31 to the Z shaft 23 via a transfer mechanism to drive the Z shaft 23. The main shaft motor 28 transmits power based on the current applied by the main shaft amplifier 32 to the main shaft 24 to drive the Z shaft 24. Thus, the X shaft motor 25 causes the X shaft 21 to move, the Y shaft motor 26 causes the Y shaft 22 to move, the Z shaft motor 27 causes the Z shaft 23 to move, and the main shaft motor 28 causes the main shaft 24 to move.

Thus, the numerical control device 1 controls the machine tool 2 according to the machining condition and the machining mode. The machine tool 2 drives the tool and the workpiece according to the control performed by the numerical control device 1. The tool mounted on the machine tool 2 cuts the workpiece according to the machining condition and the machining mode.

The X shaft amplifier 29 transmits X shaft current information indicating the value of current applied to the X shaft motor 25 to the communication unit 14, and the Y shaft amplifier 30 transmits Y shaft current information indicating the value of current applied to the Y shaft motor 26 to the communication unit 14. The Z shaft amplifier 31 transmits Z shaft current information indicating the value of current applied to the Z shaft motor 27 to the communication unit 14, and the main shaft amplifier 32 transmits main shaft current information indicating the value of current applied to the main shaft motor 28 to the communication unit 14.

The numerical control device 1 further includes an estimation unit 15 for estimating the accumulation amount of swarf produced when the tool cuts the workpiece on the basis of the machining condition indicated by the first information stored in the storage unit 12, and the respective values of currents indicated by the X shaft current information, the Y shaft current information, the Z shaft current information, and the main shaft current information. In other words, the estimation unit 15 estimates the accumulation amount of swarf produced when the tool cuts the workpiece on the basis of the machining condition and the values of currents to be applied to motors for causing shafts of the machine tool 2 to move when the tool cuts the workpiece. At least one of the shafts is the main shaft 24. The shafts may include some or all of the main shaft 24, the X shaft 21, the Y shaft 22, and the Z shaft 23. At least one of the motors is the main shaft motor 28. The motors may include some or all of the main shaft motor 28, the X shaft motor 25, the Y shaft motor 26, and the Z shaft motor 27.

Specifically, the communication unit 14 receives the X shaft current information from the X shaft amplifier 29, the Y shaft current information from the Y shaft amplifier 30, the Z shaft current information from the Z shaft amplifier 31, and the main shaft current information from the main shaft amplifier 32, and transmits the X shaft current information, the Y shaft current information, the Z shaft current information, and the main shaft current information to the estimation unit 15. The estimation unit 15 receives the X shaft current information, the Y shaft current information, the Z shaft current information, and the main shaft current information from the communication unit 14. The estimation unit 15 estimates the accumulation amount of swarf on the basis of the machining condition, and the values of currents indicated by the X shaft current information, the Y shaft current information, the Z shaft current information, and the main shaft current information received from the communication unit 14.

When cutting of a workpiece is performed, a load depending on the cutting is applied to the main shaft 24, and the main shaft motor 28 thus needs to generate a relatively large power, which makes the value of current indicated by the main shaft current information relatively large. In other words, the value of current indicated by the main shaft current information is larger when cutting of a workpiece is performed than that indicated by the main shaft current information when cutting of a workpiece is not performed. Hereinafter, the load depending on cutting will be referred to as a "cutting load".

Assume that the value of current indicated by the main shaft current information when cutting of a workpiece is performed is a first value, and the value of current indicated by the main shaft current information when cutting of a workpiece is not performed is a second value. As described above, the value of current indicated by the main shaft current information when cutting of a workpiece is performed is larger than the value of current indicated by the main shaft current information when cutting of a workpiece is not performed. Thus, the first value is larger than the second value.

Determination on whether or not cutting of a workpiece is being performed can thus be made by determination on whether the value of current indicated by the main shaft current information is the first value or the second value. Furthermore, determination on whether or not swarf is produced can be made by determination on whether the value of current indicated by the main shaft current information is the first value or the second value. The accumulation amount of swarf is therefore correlated to the time period during which the value of current indicated by the main shaft current information is the first value. In other words, the value of current indicated by the main shaft current information and the accumulation amount of swarf are correlated to each other. As described above, the values of currents to be applied to the motors for causing the shafts of the machine tool 2 to move when the tool cuts the workpiece and the accumulation amount of swarf are correlated to each other.

For example, the machining condition indicates the material of the workpiece. The accumulation amount of swarf depends on the material of the workpiece. For example, the machining condition indicates the cutting depth to which the tool is to cut the workpiece. The accumulation amount of swarf is relatively large when the cutting depth is relatively large, and the accumulation amount of swarf is relatively small when the cutting depth is relatively small. In this manner, the machining condition and the accumulation amount of swarf are correlated to each other.

As described above, the values of current to be applied to the motors for causing the shafts of the machine tool 2 to move when the tool cuts the workpiece and the accumulation amount of swarf are correlated to each other, and the machining condition and the accumulation amount of swarf are correlated to each other. The estimation unit 15 estimates the accumulation amount of swarf to be produced when the tool cuts the workpiece on the basis of the machining condition and the values of currents to be applied to the motors for causing the shafts of the machine tool 2 when the tool cuts the workpiece. As described above, at least one of the shafts is the main shaft 24. The shafts may include some or all of the main shaft 24, the X shaft 21, the Y shaft 22, and the Z shaft 23. At least one of the motors is the main shaft motor 28. The motors may include some or all of the main shaft motor 28, the X shaft motor 25, the Y shaft motor 26, and the Z shaft motor 27.

The numerical control device 1 further includes a correction unit 16 for correcting the accumulation amount of swarf estimated by the estimation unit 15 on the basis of the machining mode indicated by the second information stored in the storage unit 12. As described above, the machining mode specifies the shape of swarf to be produced when the tool cuts the workpiece. Details of the functions of the correction unit 16 will be described later with examples of the machining mode with reference to FIG. 3.

The numerical control device 1 further includes a determination unit 17 for determining whether or not the accumulation amount of swarf resulting from the correction by the correction unit 16 is equal to or larger than a predetermined amount. The determination unit 17 includes a storage unit. One example of the storage unit is a flash memory. The storage unit stores in advance information indicating the predetermined amount. The determination unit 17 determines whether or not the accumulation amount of swarf resulting from the correction by the correction unit 16 is equal to or larger than the predetermined amount on the basis of the information stored in the storage unit.

The numerical control device 1 further includes an informing unit 18 for providing information indicating that the accumulation amount of swarf resulting from the correction by the correction unit 16 is equal to or larger than the predetermined amount to the outside of the numerical control device 1. When the accumulation amount of swarf resulting from the correction by the correction unit 16 is determined to be equal to or larger than the predetermined amount by the determination unit 17, the informing unit 18 provides the information indicating that the accumulation amount of swarf is equal to or larger than the predetermined amount.

For example, the informing unit 18 provides the information indicating that the accumulation amount of swarf resulting from the correction by the correction unit 16 is equal to or larger than the predetermined amount by using sound or light. The informing unit 18 may alternatively include a speaker or a lamp, and provide the information indicating that the accumulation amount of swarf resulting from the correction by the correction unit 16 is equal to or larger than the predetermined amount by using the speaker or the lamp.

Figures 2, 3:
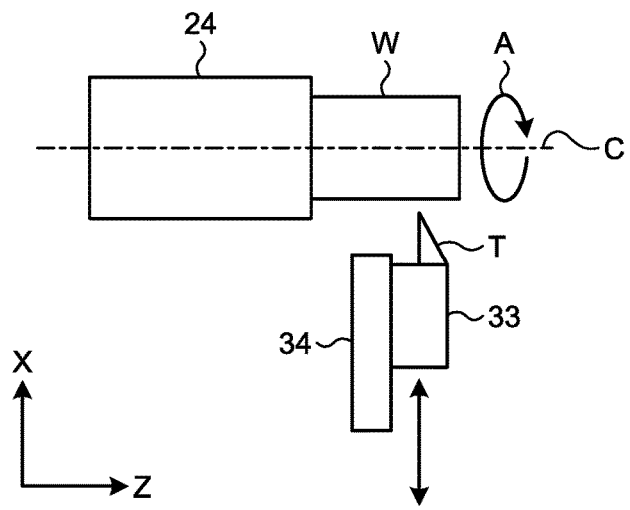
FIG. 2 is a diagram schematically illustrating a side view of a machine tool according to the embodiment.
FIG. 3 is a table for explaining a machining mode according to the embodiment.

Next, the machine tool 2, a tool T, and a workpiece W will be described. FIG. 2 is a diagram schematically illustrating a side view of the machine tool 2 according to the embodiment. As described above, the machine tool 2 includes the X shaft 21, the Y shaft 22, the Z shaft 23, the main shaft 24, the X shaft motor 25, the Y shaft motor 26, the Z shaft motor 27, the main shaft motor 28, the X shaft amplifier 29, the Y shaft amplifier 30, the Z shaft amplifier 31, and the main shaft amplifier 32. FIG. 2 illustrates that one direction parallel to X shaft 21 is represented by "X" and one direction parallel to the Z shaft 23 is represented by "Z".

The machine tool 2 further includes a tool rest 33 on which the tool T is mounted, and a transfer mechanism 34 for driving the tool rest 33. Specifically, the transfer mechanism 34 transfers power from the X shaft motor 25 to the X shaft 21 to move the tool rest 33 in the direction parallel to the X shaft 21. Although not illustrated in FIG. 2, the machine tool 2 further includes a transfer mechanism for moving the tool rest 33 in a direction parallel to the Y shaft 22, and a transfer mechanism for moving the tool rest 33 in the direction parallel to the Z shaft 23. FIG. 2 also illustrates the main shaft 24. The main shaft 24 rotates about a rotation axis C in the direction of an arc arrow A. The rotation axis C includes the central axis of the main shaft 24. FIG. 2 illustrates a state in which the workpiece W is mounted on the main shaft 24. FIG. 2 also illustrates a state in which the tool T is mounted on the tool rest 33. The tool T is a cutting tool for cutting the workpiece W.

The machine tool 2 operates according to the control of the numerical control device 1, the main shaft 24 on which the workpiece W is mounted rotates about the rotation axis C in the direction of the arc arrow A, and the tool T comes in contact with the workpiece W rotating with the rotation of the main shaft 24, so that the tool T cuts the workpiece W.

Next, the machining mode will be described. FIG. 3 is a table for explaining the machining mode according to the embodiment. In the embodiment, a first machining mode and a second machining mode are defined. The first machining mode is a mode in which the workpiece W is a circular column and in which the tool T cuts the workpiece W mounted on the main shaft 24 with the central axis of the circular column aligned with the central axis of the main shaft 24. The second machining mode is a mode in which the workpiece W is a column other than circular columns, the column having an elliptical cross section perpendicular to its central axis, and in which the tool T cuts the workpiece W mounted on the main shaft 24 with the central axis of the column aligned with the central axis of the main shaft 24.

In other words, cutting is performed in the first machining mode in a case where the workpiece W is a circular column, or cutting is performed in the second machining mode in a case where the workpiece W is a column other than circular columns and has an elliptical cross section perpendicular to its central axis. FIG. 3 illustrates the rotating directions of the motors, the purposes of current, and the shape of swarf for each of cutting in the first machining mode and cutting in the second machining mode. Thus, each of the first machining mode and the second machining mode specifies the relation between the rotating directions of the motors and the shape of swarf, specifies the relation between the purposes of the currents flowing in the motors and the shape of swarf, and specifies the relation of the rotating directions of the motors and the purposes of the current flowing in the motors with the shape of swarf.

In cutting in the first machining mode, since the tool T moves in the direction X and then moves in the direction Z in FIG. 2 with the rotation of the workpiece W, both of the rotating direction of the X shaft motor 25 associated with the X shaft 21 and the rotating direction of the Z shaft motor 27 associated with the Z shaft 23 are unidirectional. The rotating direction of the main shaft motor 28 associated with the main shaft 24 is also unidirectional. Since the rotating directions of the X shaft motor 25, the Z shaft motor 27, and the main shaft motor 28 are unidirectional, neither acceleration torque nor deceleration torque needs to be generated.

Thus, the currents flowing in the X shaft motor 25, the Z shaft motor 27, and the main shaft motor 28 are currents determined by the cutting load. In other words, in cutting in the first machining mode, the currents flowing in the X shaft motor 25, the Z shaft motor 27, and the main shaft motor 28 are used for the cutting load. In cutting in the first machining mode, the shape of swarf produced when the tool T cuts the workpiece W is spiral since the tool T is continuously in contact with workpiece W. This means that swarf is continuous.

In cutting in the second machining mode, since the cross section of the workpiece W is elliptical, the tool T needs to reciprocate in the radial direction of the workpiece W in synchronization with the rotation of the workpiece W while the workpiece W rotates. Specifically, the tool T needs to move backwards and forwards twice in the radial direction of the workpiece W while the workpiece W rotates by one turn. In other words, the tool rest 33 needs to move backwards and forwards twice in the direction parallel to the X shaft 21 while the workpiece W rotates by one turn. Furthermore, the X shaft 21 needs to move backwards and forwards twice. Thus, in cutting in the second machining mode, the rotating direction of the X shaft motor 25 associated with the X shaft 21 is bidirectional. The rotating direction of the Z shaft motor 27 associated with the Z shaft 23 and the rotating direction of the main shaft motor 28 associated with the main shaft 24 are unidirectional.

In cutting in the second machining mode, since the rotating direction of the X shaft motor 25 associated with the X shaft 21 is bidirectional, the inertia of the transfer mechanism 34 increases, and acceleration torque and deceleration torque need to be generated. Thus, current for generating acceleration torque and deceleration torque needs to be applied to the X shaft motor 25, and the amount of current needs to be changed periodically. Thus, in cutting in the second machining mode, the current flowing in the X shaft motor 25 is used for the cutting load and the acceleration/deceleration, and the currents flowing in the Z shaft motor 27 and the main shaft motor 28 are used for the cutting load. In cutting in the second machining mode, the shape of swarf produced when the tool T cuts the workpiece W is in a form of chips since the tool T leaves the workpiece W periodically. Thus, swarf is divided into a plurality of chips.

In cutting in the second machining mode, since the tool T reciprocates as described above, a term "vibration turning" is written in a field explaining the second machining mode in FIG. 3. In a field explaining the first machining mode in FIG. 3, a term "normal turning" is written for comparison with "vibration turning".

In the embodiment, the correction unit 16 identifies which of the first machining mode and the second machining mode the machining mode indicated by the second information stored in the storage unit 12 is. The correction unit 16 determines whether the swarf will be continuous or divided into chips on the basis of the identified machining mode, and corrects the accumulation amount of swarf estimated by the estimation unit 15 on the basis of the determination result.

As described above, the numerical control device 1 according to the embodiment estimates the accumulation amount of swarf to be produced when the tool T cuts the workpiece W on the basis of the machining condition and the values of currents to be applied to the motors included in the machine tool 2 when the tool T cuts the workpiece W, and corrects the estimated accumulation amount of swarf on the basis of the machining mode. Specifically, numerical control device 1 determines whether swarf will be continuous or divided into chips on the basis of the machining mode, and corrects the accumulation amount of swarf on the basis of the determination result.

Even with the same mass of swarf, the volume of continuous swarf tends to be larger than the volume of swarf in chips since gaps are likely to be produced in continuous swarf. As described above, the numerical control device 1 determines whether swarf will be continuous or divided into chips on the basis of the machining mode and corrects the accumulation amount of swarf on the basis of the determination, which allows estimation of a more exact accumulation amount of swarf. This allows the numerical control device 1 to inform an operator of appropriate timing to remove swarf. Thus, the numerical control device 1 produces an advantageous effect of assisting an operator to remove swarf at appropriate timing.

Note that, in the embodiment described above, the communication unit 14 transmits information indicating the X shaft command value for controlling the operation of the X shaft 21 to the X shaft amplifier 29, information indicating the Y shaft command value for controlling the operation of the Y shaft 22 to the Y shaft amplifier 30, information indicating the Z shaft command value for controlling the operation of the Z shaft 23 to the Z shaft amplifier 31, and information indicating the main shaft command value for controlling the operation of the main shaft 24 to the main shaft amplifier 32. The communication unit 14 may, however, transmit the information indicating the X shaft command value, the information indicating the Y shaft command value, the information indicating the Z shaft command value, and the information indicating the main shaft command value to any one of the X shaft amplifier 29, the Y shaft amplifier 30, the Z shaft amplifier 31, and the main shaft amplifier 32. In this case, the information indicating the X shaft command value, the information indicating the Y shaft command value, the information indicating the Z shaft command value, and the information indicating the main shaft command value are transmitted and received among the X shaft amplifier 29, the Y shaft amplifier 30, the Z shaft amplifier 31, and the main shaft amplifier 32.

Similarly, the X shaft current information, the Y shaft current information, the Z shaft current information, and the main shaft current information may be transmitted and received among the X shaft amplifier 29, the Y shaft amplifier 30, the Z shaft amplifier 31, and the main shaft amplifier 32 such that the X shaft current information, the Y shaft current information, the Z shaft current information, and the main shaft current information are collected in any one of the X shaft amplifier 29, the Y shaft amplifier 30, the Z shaft amplifier 31, and the main shaft amplifier 32. In this case, the communication unit 14 receives the X shaft current information, the Y shaft current information, the Z shaft current information, and the main shaft current information from one of the X shaft amplifier 29, the Y shaft amplifier 30, the Z shaft amplifier 31, and the main shaft amplifier 32.

In FIG. 3, each of the first machining mode and the second machining mode specifies first relation between the rotating directions of the motors and the shape of swarf, second relation between the purposes of the currents flowing in the motors and the shape of swarf, and third relation of the rotating directions of the motors and the purposes of the current flowing in the motors with the shape of swarf. The machining modes, however, may specify any one of the first relation, the second relation, and the third relation described above.

In the embodiment described above, the information indicating the predetermined amount is stored in advance in the storage unit of the determination unit 17, and the determination unit 17 determines whether or not the accumulation amount of swarf resulting from the correction by the correction unit 16 is equal to or larger than the predetermined amount. Alternatively, the receiving unit 11 may receive information indicating the predetermined amount from outside of the numerical control device 1, and the information indicating the predetermined amount received by the receiving unit 11 may be stored in the storage unit of the determination unit 17. In this case, the operator can freely determine the predetermined amount, and thus change the timing of removing swarf.

The receiving unit 11 may receive information for correcting the accumulation amount of swarf from outside of the numerical control device 1. When the receiving unit 11 has received the information for correcting the accumulation amount of swarf, the correction unit 16 corrects the accumulation amount of swarf on the basis of the machining mode and the information received by the receiving unit 11. In this case, the operator can make the numerical control device 1 estimate a more exact accumulation amount of swarf by checking the actual cutting and inputting information for correcting the accumulation amount of swarf to the numerical control device 1. In other words, the numerical control device 1 is able to estimate a more exact accumulation amount of swarf on the basis of the information for correcting the accumulation amount of swarf.

The numerical control device 1 may have a function of halting the operation of the machine tool 2 when the accumulation amount of swarf resulting from the correction by the correction unit 16 is determined to be equal to or larger than the predetermined amount by the determination unit 17.

The configurations presented in the embodiment above are examples of the present invention, and can be combined with other known technologies or can be partly omitted or modified without departing from the scope of the present invention.

REFERENCE SIGNS LIST 1 numerical control device; 2 machine tool; 11 receiving unit; 12 storage unit; 13 command unit; 14 communication unit; 15 estimation unit; 16 correction unit; 17 determination unit; 18 informing unit; 21 X shaft; 22 Y shaft; 23 Z shaft; 24 main shaft; 25 X shaft motor; 26 Y shaft motor; 27 Z shaft motor; 28 main shaft motor; 29 X shaft amplifier; 30 Y shaft amplifier; 31 Z shaft amplifier; 32 main shaft amplifier; 33 tool rest; 34 transfer mechanism; A arc arrow; C rotation axis; T tool; W workpiece.

The invention claimed is:

1. A numerical control device comprising:
   an estimator to estimate an accumulation amount of swarf to be produced when a tool mounted on a machine tool cuts a workpiece, the estimator estimates the accumulation amount of swarf on the basis of a machining condition in cutting the workpiece by the tool and a value of current to be applied to a motor for moving a shaft of the machine tool when the tool cuts the workpiece; and
   a corrector to correct the accumulation amount of swarf estimated by the estimator on the basis of a machining mode specifying a shape of swarf to be produced when the tool cuts the workpiece, wherein
   the machining mode specifies any one of relation between a rotating direction of the motor and the shape of the swarf, relation between a purpose of current flowing in the motor and the shape of the swarf, and relation of the rotating direction of the motor and the purpose of current flowing in the motor with the shape of the swarf, and
   the corrector determines whether the swarf will be continuous or divided into a plurality of chips on the basis of the machining mode, and corrects the accumulation amount of swarf on the basis of a result of the determination.

2. The numerical control device according to claim 1, wherein
   the machining condition indicates some or all of a material of the workpiece, a cutting depth, and a feed speed of the tool.

3. The numerical control device according to claim 2, further comprising:
   a receiver to receive information for correcting the accumulation amount of swarf, wherein
   the corrector corrects the accumulation amount of swarf on the basis of the machining mode and the information received by the receiver.

4. The numerical control device according to claim 1, further comprising:
   a receiver to receive information for correcting the accumulation amount of swarf, wherein
   the corrector corrects the accumulation amount of swarf on the basis of the machining mode and the information received by the receiver.

5. A method of numerical control comprising:
   estimating an accumulation amount of swarf to be produced when a tool mounted on a machine tool cuts a workpiece, the accumulation amount of swarf is estimated by the estimating on the basis of a machining condition in cutting the workpiece by the tool and a value of current to be applied to a motor for moving a shaft of the machine tool when the tool cuts the workpiece;
   correcting the accumulation amount of swarf estimated on the basis of a machining mode specifying a shape of swarf to be produced when the tool cuts the workpiece.

6. The numerical control device according to claim 1, further comprising:
   a current command generator that outputs, to the estimator and the machine tool, a command indicating the value of current to be applied to the motor for moving the shaft of the machine tool when the tool cuts the workpiece; and
   the estimator receives, from the current command generator, the value of current to be applied to the motor for moving the shaft of the machine tool when the tool cuts the workpiece, the machining mode specifying any one of relation between a rotating direction of the motor and the shape of the swarf, relation between a purpose of current flowing in the motor and the shape of the swarf, and relation of the rotating direction of the motor and the purpose of current flowing in the motor with the shape of the swarf;
   determining whether the swarf will be continuous or divided into a plurality of chips on the basis of the machining mode; and correcting the accumulation amount of swarf on the basis of a result of the determining.

7. The numerical control device according to claim 1, wherein the estimator determines a time period during which the value of current to be applied to the motor for moving the shaft of the machine tool when the tool cuts the workpiece, and further estimates the accumulation amount of swarf based on the determined time period.

8. The numerical control device according to claim 2, wherein the estimator estimates the accumulation amount of swarf to be larger when the cutting depth is relatively large, and estimates the accumulation amount of swarf to be smaller when the cutting depth is relatively small.

9. A numerical control comprising:
   an estimator to estimate an accumulation amount of swarf to be produced when a tool mounted on a machine tool cuts a workpiece, the esstimator estimates the accumulation amount of swarf is on the basis of a machining condition in cutting the workpiece by the tool and a value of current to be applied to a motor for moving a shaft of the machine tool when the tool cuts the workpiece;
   a corrector to correct the accumulation amount of swarf estimated by the estimator on the basis of a machining mode specifying a shape of swarf to be produced when the tool cuts the workpiece, and
   a receiver to receive information for correcting the accumulation amount of swarf, wherein
   the corrector corrects the accumulation amount of swarf on the basis of the machining mode and the information received by the receiver.

10. A method of numerical control comprising:
    estimating an accumulation amount of swarf to be produced when a tool mounted on a machine tool cuts a workpiece, the accumulation amount of swarf is estimated by the estimating on the basis of a machining condition in cutting the workpiece by the tool and a value of current to be applied to a motor for moving a shaft of the machine tool when the tool cuts the workpiece;
    correcting the accumulation amount of swarf estimated by the estimator on the basis of a machining mode specifying a shape of swarf to be produced when the tool cuts the workpiece;
    receiving information for correcting the accumulation amount of swarf, and
    the correcting corrects the accumulation amount of swarf on the basis of the machining mode and the information received by the receiver.

* * * * *